United States Patent [19]
Takei

[11] Patent Number: 5,261,860
[45] Date of Patent: Nov. 16, 1993

[54] DRIVE APPARATUS

[75] Inventor: Seiji Takei, Kanagawa, Japan

[73] Assignee: Nippon Thompson Co., Ltd., Tokyo, Japan

[21] Appl. No.: 979,217

[22] Filed: Nov. 20, 1992

[30] Foreign Application Priority Data

Nov. 25, 1991 [JP] Japan .................. 3-334525

[51] Int. Cl.⁵ .............................. F16H 7/00
[52] U.S. Cl. ...................... 474/139; 474/137
[58] Field of Search ............ 474/101, 109, 111, 113, 474/134, 137, 139

[56] References Cited

U.S. PATENT DOCUMENTS

| | | | |
|---|---|---|---|
| 840,729 | 1/1907 | Willson, Jr. | 474/139 X |
| 3,895,544 | 7/1975 | Suzaki | 474/134 X |
| 4,068,535 | 1/1978 | Sheets | 474/137 X |

Primary Examiner—Thuy M. Bui
Attorney, Agent, or Firm—Sughrue, Mion, Zinn, Macpeak & Seas

[57] ABSTRACT

A drive apparatus, able to perform positioning of a driven object to be driven with a high degree of accuracy, sufficiently obtain the desired thrust even when using the low output of a driving source such as a motor, and allow the speed of movement of the driven object to be set as desired, is provided. This drive device, wherein a first belt-shaped member, to which driving force is applied with a driving source such as a motor, is engaged with a driven object to move said driven object, is equipped with a speed reduction function that functions by mounting a rotating body having a large diameter portion and a small diameter portion onto said driven object, engaging this large diameter portion with a belt-shaped member, stretching another belt-shaped member parallel to said belt-shaped member, engaging this belt-shaped member with the above-mentioned small diameter portion, and setting the ratio of the diameters of the above-mentioned large diameter and small diameter portions as desired.

12 Claims, 5 Drawing Sheets

DRIVE APPARATUS

BACKGROUND OF THE INVENTION

1. Field of the Invention

The present invention relates to a drive apparatus for moving a certain object (driven object) in a desired direction.

2. Description of the Prior Art

An example of the prior art having this type of drive apparatus is the XY drive apparatus indicated in FIG. 1. As indicated in FIG. 1, said XY drive apparatus is comprised of X table 1 installed on the floor or a mounting frame in a workplace, and Y table 2 moved by said X table 1. Furthermore, as X table 1 and Y table 2 mutually have nearly the same constitution, the following explanation will be provided with respect to X table 1 only, with an explanation of Y table 2 omitted. However, those constituent members of Y table 2 that correspond to the constituent members of X table 1 are indicated using the same reference numerals. Furthermore, an exploded view of the constituent members of X table 1 divided into suitable sections is indicated in FIG. 2.

As indicated in FIG. 1, X table 1 has rectangular plate-shaped base 5, and side plate 6, provided on said base 5 and forming a box with said base 5. Motor 7 is mounted on one end of this side plate 6. In addition, as is indicated in FIG. 2, pulley 9 is fit onto output shaft 7a of motor 7. In addition, another pulley 10 is arranged on base 5, and is mounted to base 5 by means of brackets not shown. A belt-shaped member in the form of endless belt 12, in this case a flat steel belt, is wrapped around pulleys 9 and 10. A driven object in the form of moving table 13 is attached to this belt 12.

As indicated in the drawings, moving table 13 has a prescribed thickness and is composed to be of a size that allows it to be contained within the width of side plate 6. Two table projections 13a projecting above the upper surface of side plate 6 are provided in parallel on the left and right sides. These table projections 13a may be formed into an integrated structure with moving table 13 or may be composed in the form of separate structures. Above-mentioned Y table 2 is mounted on the upper surface of said table projections. Furthermore, cover 15 is arranged to the inside of these table projections 13a, acting to prevent entrance of dust and so on.

A driving device that drives the belt-shaped member in the form of belt 12 is comprised of the above-mentioned motor 7, pulley 9 and pulley 10. In addition, the drive apparatus, which moves the driven object, moving table 13, by applying a driving force, is comprised of said drive device and belt 12.

On the other hand, as is indicated in FIG. 2, a pair of linear motion rolling guide units 17 are mutually arranged in parallel on the right and left sides beneath the above-mentioned drive apparatus, and are mounted on base 5. These linear motion rolling guide units 17 receive the load in all four directions (the directions indicated by arrows Z and Y as well as their respective opposite directions) applied to moving table 13, and also act as guiding devices that guide moving table 13.

This linear motion rolling guide unit 17 is comprised of track rail 18, roughly in the shape of a square column, in which circular ball track rail groove 18a is formed in the left and right shoulders of the side wall, slider 20, having a cross-section roughly in the shape of the letter "U", in which circular ball track rail groove 20a is formed in opposition to ball track rail groove 18a of track rail 18, and flat plate-shaped retainers (not shown), arranged at equal intervals in the sliding direction between ball track rail grooves 18a and 20a, and holding the ball while allowing rotation. Furthermore, linear motion rolling guide units 17 are not limited to the use of a ball, but may also use other devices such as a roller as long as they are of a constitution that uses a rolling object.

The following provides an explanation of the operation of the XY table having the above-mentioned constitution. Furthermore, as X table 1 and Y table 2 have the same constitution as described above, the following explanation will concentrate on X table 1.

Firstly, when a power voltage is supplied to motor 7 of X table 1, output shaft 7a of motor 7, serving as the driving source, rotates which transmits torque to pulley 9. Then, belt 12 wrapped around pulley 9 and pulley 10 is driven in a prescribed direction, and moving table 13 mounted on the upper surface of this belt 12 also moves in the same direction. Conversely, when the direction of rotation of motor 7 is reversed, belt 12 is driven in the opposite direction from that above, and consequently, moving table 13 also moves in that direction. In addition, the movement of moving table 13 is controlled by a control circuit comprised of a microcomputer and so on. A detector, which outputs a position detection signal to this control circuit, is composed to be able to be mounted to the inside of side plate 6 indicated in FIG. 1, and on the upper surface of base 5. In addition, detection may also be performed by an encoder mounted behind motor 7.

In addition, since Y table 2 is mounted on table projections 13a of moving table 13 equipped on X table 1, it moves in the X direction which is the same direction as moving table 13 of X table 1. As moving table 13 of Y table 2 is independently composed so as to be able to move linearly in the Y direction, by controlling these with a control circuit not shown, moving table 13 of Y table 2 can be moved in both the X and Y directions.

As described above, the drive apparatus of the prior art equipped with an XY table is composed so that a driving force from motor 7 is transmitted by means of pulley 9 to belt 12 by simply belt 12 being directly coupled to a driven object in the form of moving table 13. For this reason, the driven amount of belt 12 and the movement amount of moving table 13 are the same. Thus, this drive apparatus of the prior art has the shortcoming of it being difficult to position moving table 13 at a desired stopping position with a high degree of accuracy in consideration of the inertia of the weight of moving table 13 and a loaded object and so on. In addition, in this constitution in which belt 12 and moving table 13 are coupled directly, as a result of the entire weight of Y table 2 and a workpiece, etc., loaded on said Y table 2 being applied to moving table 13 of X table 1, there is the risk of the torque of motor 7 of X table 1 being insufficient with respect to this increase in the weight load, thereby preventing Y table 2 from moving on X table 1.

SUMMARY OF THE INVENTION

In consideration of the above-mentioned shortcomings of the prior art, the object of the present invention is to provide a drive apparatus that allows positioning of a driven object with a high degree of accuracy, adequately obtains a desired thrust using a driving force equal to that of the prior art, and allows the moving speed of the driven object to be set as desired with respect to the output speed of the motor, etc., serving as the motive power source.

The present invention is comprised having: a first belt-shaped member; a driving device that drives the above-mentioned belt-shaped member; a rotating body which is composed of a large diameter portion and small diameter portion mutually and concentrically coupled together, mounted to a driven body to be moved, and engaged with the above-mentioned first belt-shaped member at the above-mentioned large diameter portion; and, a second belt-shaped member stretched nearly parallel to the above-mentioned first belt-shaped member on a fixed side, and engaged with the above-mentioned small diameter portion.

DESCRIPTION OF THE PREFERRED EMBODIMENTS

Figure 1:
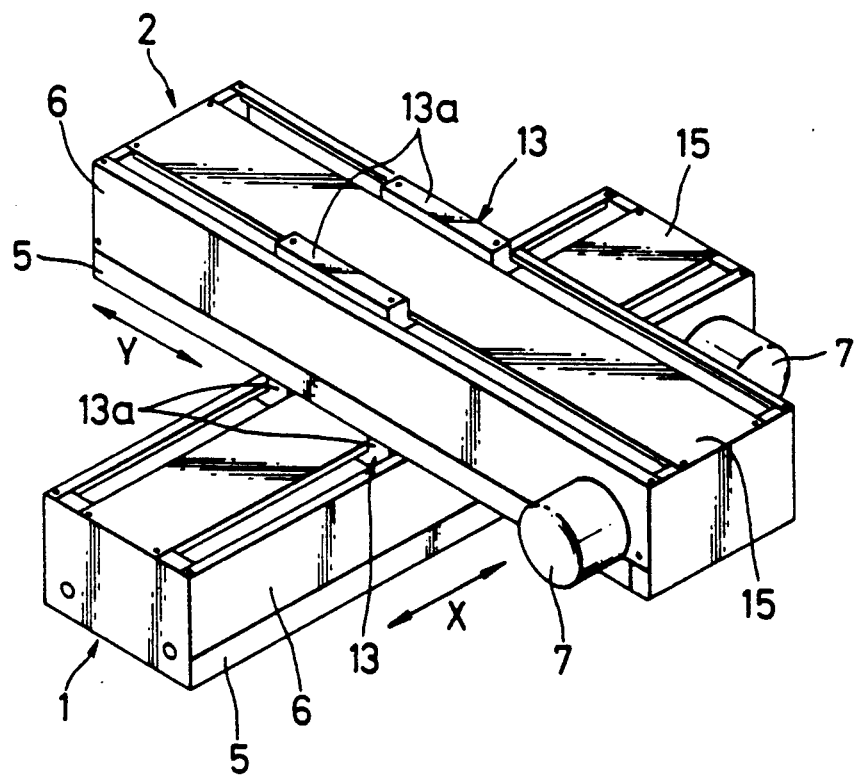
FIG. 1 is a perspective view of an XY table equipped with the drive apparatus of the prior art.
Figure 2:
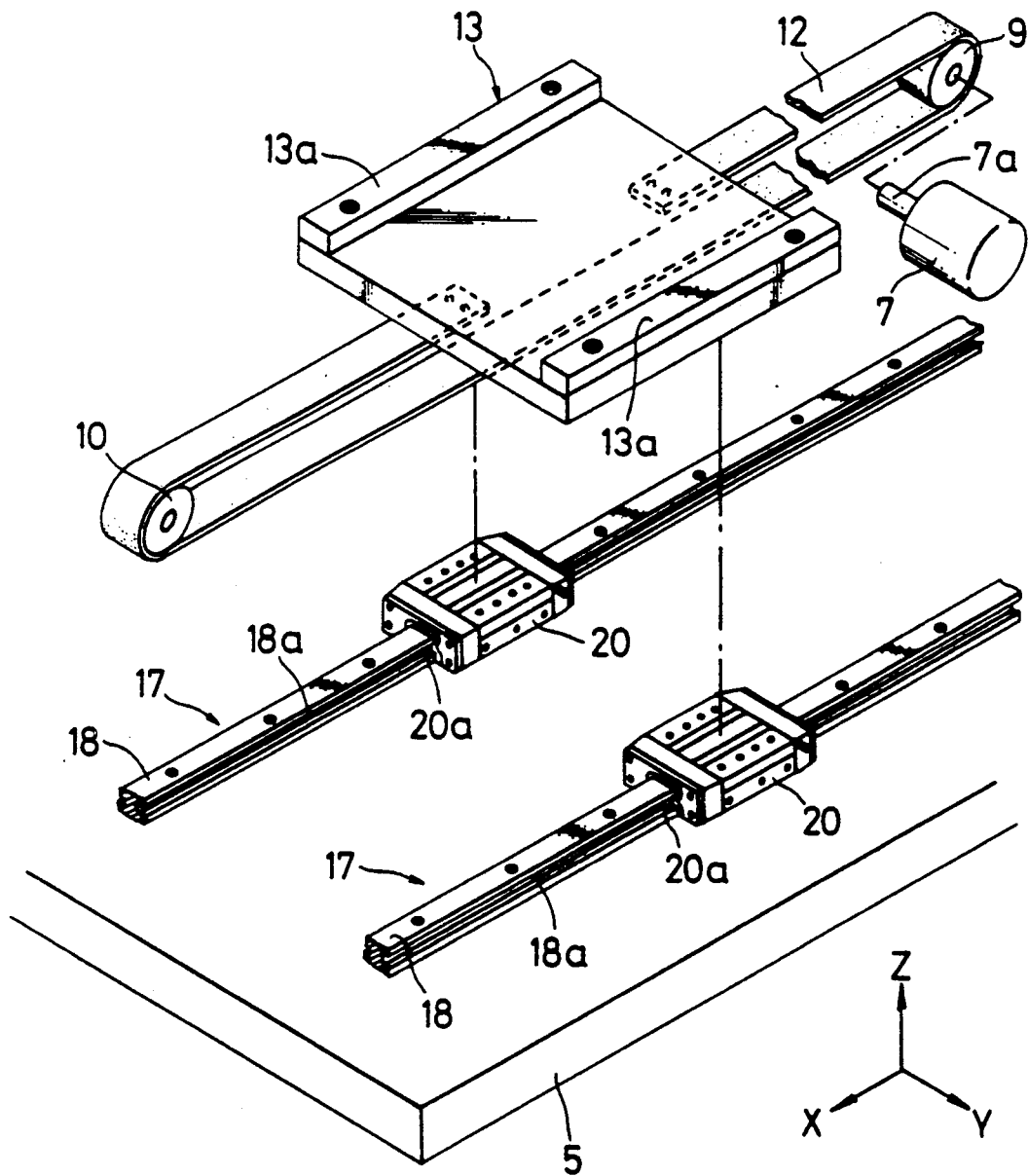
FIG. 2 is an exploded perspective view of the essential components of the XY table indicated in FIG. 1.

The following provides a detailed explanation of an XY table including a drive apparatus as an embodiment of the present invention in reference to the attached drawings. Furthermore, since said XY table is composed in the same manner as that of the prior art indicated in FIGS. 1 and 2 with the exception of the portions described below, a general explanation of said XY table is omitted. In addition, in the explanation provided below, the same reference numbers are used for those members that are identical or correspond to the constituent members of the apparatus of the prior art.

Figure 3:
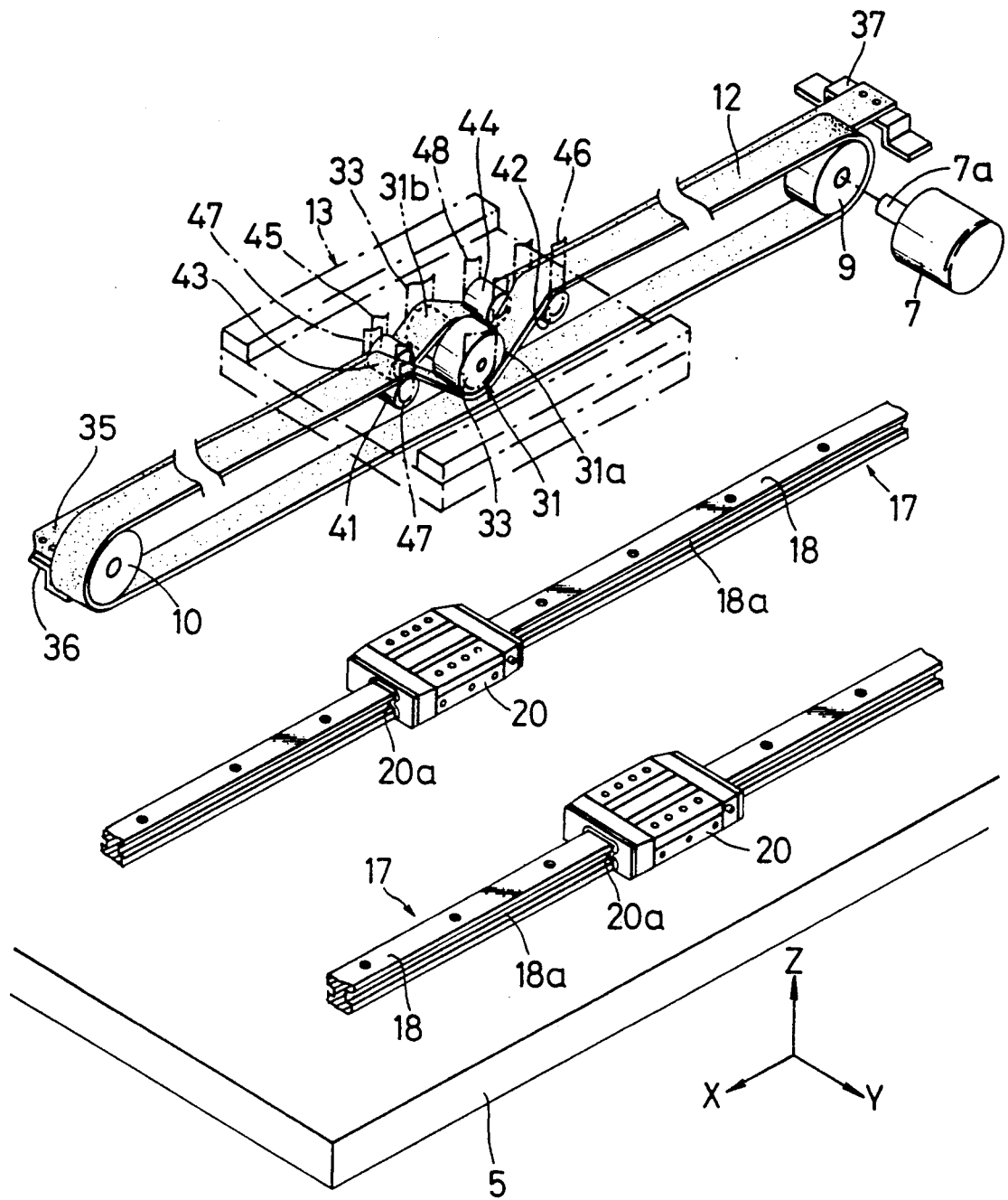
FIG. 3 is an exploded perspective view of the essential components of an XY table including the drive apparatus pertaining to the present invention.
Figure 4:
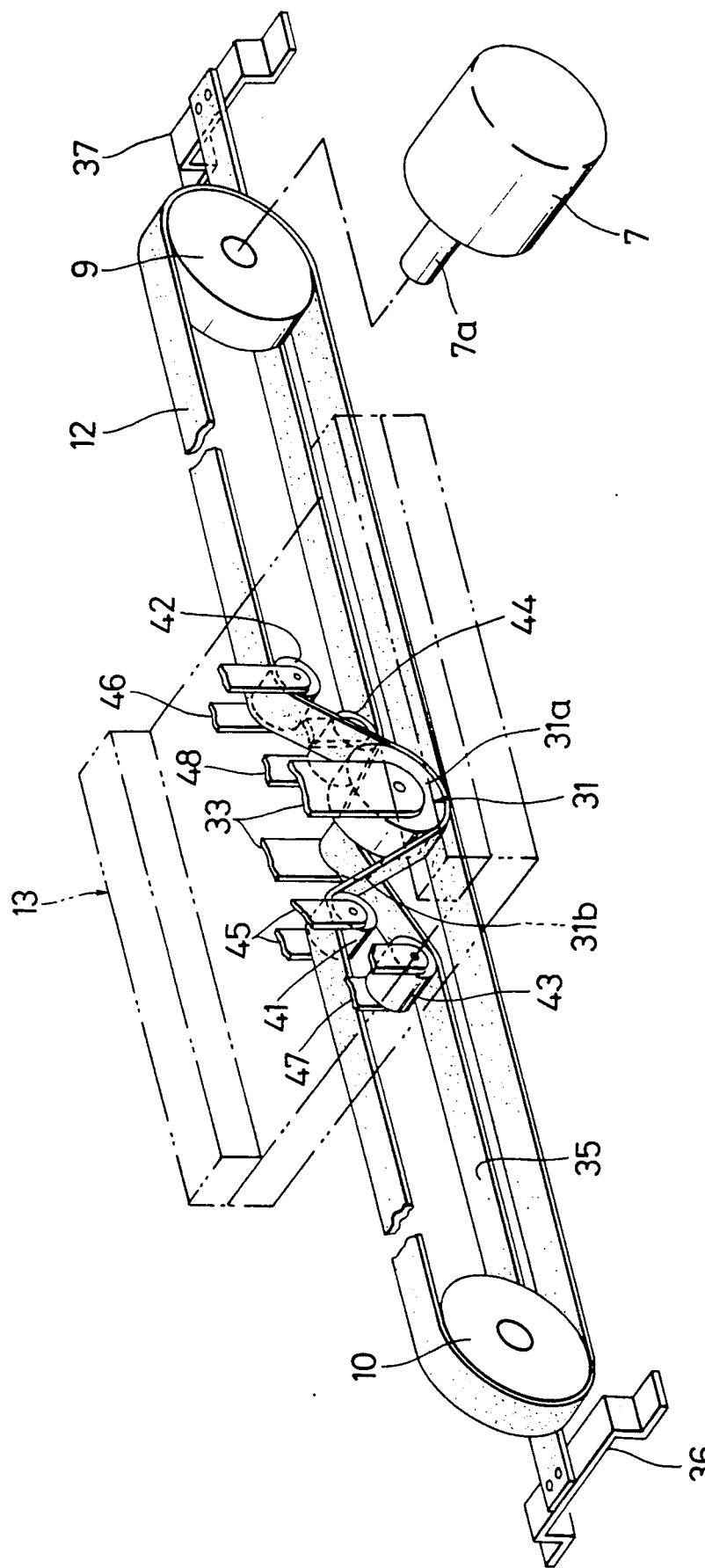
FIG. 4 is a perspective view of a drive device equipped on the XY table indicated in FIG. 3.
Figure 5:
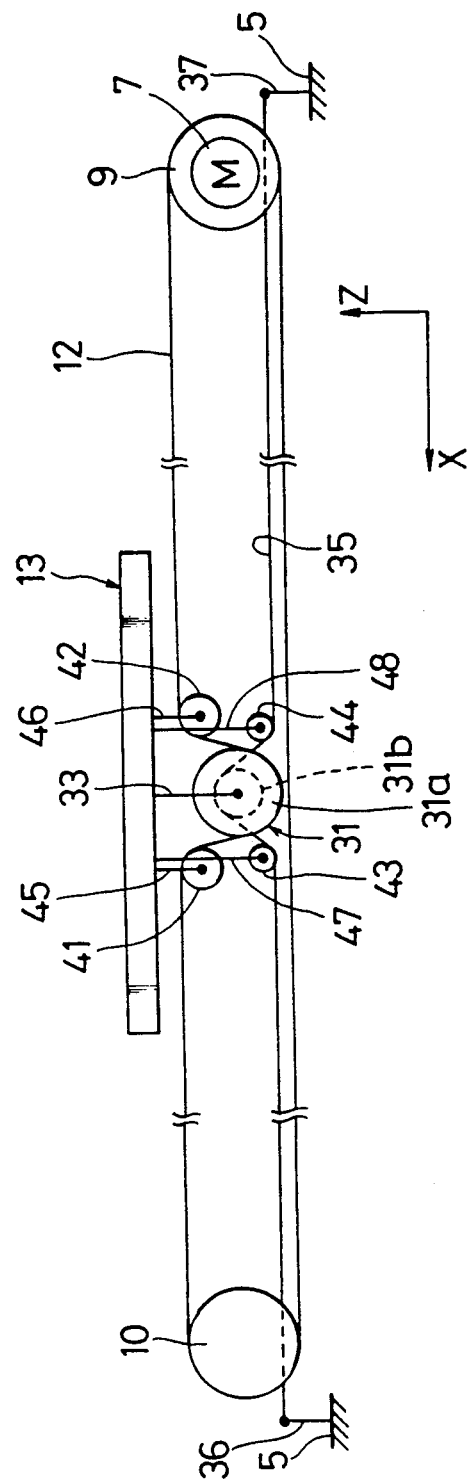
FIG. 5 is schematic illustration conceptually indicating the mechanism of the drive apparatus indicated in FIG. 4.

As indicated in FIG. 3 through FIG. 5, in the XY table pertaining to the present invention, a drive apparatus equipped on an XY table, for example, has a first belt-shaped member in the form of endless belt 12, and a compound pulley 31 having a large diameter portion 31a which engages with said belt 12, or in other words a rotating body, mounted drives belt 12 is composed of these pulleys 9 and 10 as well as motor 7.

Small diameter portion 31b is formed concentrically and in an integrated structure with the above-mentioned large diameter portion 31a in compound pulley 31. Secondary belt-shaped member in the form of stationary belt 35 is stretched parallel to the above-mentioned belt 12 and engaged with this small diameter portion 31b. Both ends of belt 35 are mounted by means of belt support plates 36 and 37 on the fixed side in the form of base 5 that holds the present drive apparatus.

Furthermore, as indicated in the drawings, four small diameter pulleys 41 through 44 are arranged in the vicinity of compound pulley 31. Each of these pulleys are mounted to the bottom surface of moving table 13 by means of brackets 45 through 48. These pulleys 41 through 44 act as pressing devices that press belts 12 and 35 against the larger diameter portion 31a and small diameter portion 31b of compound pulley 31 by bending their respective paths of travel. As a result of providing said pressing devices, engagement of the compound pulley with each belt is effectively maintained. Furthermore, in said embodiment, belts 12 and 35 are composed of steel belts formed into a flat or V shape. A prescribed coating, having a high coefficient of friction so as to obtain sufficient frictional force for driving of the belts, is applied to the mutual engaging surfaces of compound pulley 31 and each of said belts.

The following provides an explanation of the operation of the drive apparatus having the above-mentioned constitution.

Firstly, pulley 9 rotates due to the forward or reverse rotation of motor 7, and belt 12 moves forward or backward. Accordingly, compound pulley 31 is rotated due to torque being applied to large diameter portion 31a of said compound pulley 31 mounted on moving table 13. Thus, small diameter portion 31b of compound pulley 13 rotates moving along belt 35, and moving table 13 moves at a reduced speed that is the product of multiplying the ratio of the diameters of the small diameter portion 31b and large diameter portion 31a by the driving speed of belt 12. As a result of this speed reducing function, the driven object in the form of moving table 13 can be positioned with a high degree of accuracy at a desired stopping position regardless of the magnitude of fluctuations in inertia of the load including moving table 13. Consequently, the load on motor 7 is reduced, and sufficient thrust can be obtained with an amount of torque equal to that of the prior art. Furthermore, the speed reduction ratio can be set as desired by changing the diameters of large diameter portion 31a and small diameter portion 31b.

Furthermore, although the types of belts 12 and 35 in the above-mentioned embodiment are either flat or V belts having a flat surface, these belts may also be timing belts having an uneven surface. In this case, it goes without saying that each of the above-mentioned pulleys that engage with said belts also have uneven surfaces around their circumference. In addition, ordinary belts having a flat surface and timing belts may also be used in combination. In addition, chains and sprockets may also be used in place of belts and pulleys. Moreover, the use of a combination of belts and chains can also be considered.

On the other hand, although the above-mentioned embodiment employs a constitution wherein belt 12 is in the form of an endless belt wrapped around pulley 9 and pulley 10 that applies torque to pulley 9 from motor 7, a constitution may also be employed wherein said belt is in the form of a stationary belt which is alternately wound up and sent out with pulleys 9 and 10 that are driven by their respective individual motors.

According to the present invention as described above, since a speed reduction is composed that reduces the amount of movement of a driven body with respect to the amount of rotation of a first belt-shaped member by suitably setting the diameters of a large diameter portion and small diameter portion of a rotating body, together with said driven body being able to be positioned with a high degree of accuracy at a stopping position, the present invention offers the advantage of being able to obtain sufficient thrust with a driving force equal to that of the prior art as a result of reducing the load applied to a driving source such as a motor. In addition, the present invention also offers the advantage of being able to set the speed reduction ratio as desired by changing the ratio of the diameters of the above-mentioned large diameter and small diameter portions.

What is claimed is:

1. A drive apparatus having: a first belt-shaped member; a driving device that drives the above-mentioned belt-shaped member; a rotating body which is composed of a large diameter portion and small diameter portion mutually and concentrically coupled together, mounted to a driven body to be moved, and engaged with the above-mentioned first belt-shaped member at the above-mentioned large diameter portion; and, a second belt-shaped member stretched nearly parallel to the above-mentioned first belt-shaped member on a fixed side, and engaged with the above-mentioned small diameter portion.

2. The drive apparatus of claim 1 having pressing devices that press the above-mentioned first and second belt-shaped members against the above-mentioned rotating body.

3. The drive apparatus of claim 1 wherein at least one of either of the above-mentioned first or second belt-shaped member is composed of a flat belt.

4. The drive apparatus of claim 2 wherein at least one of either of the above-mentioned first or second belt-shaped member is composed of a flat belt.

5. The drive apparatus of claim 3 wherein the above-mentioned flat belt is composed of a timing belt having an uneven surface.

6. The drive apparatus of claim 4 wherein the above-mentioned flat belt is composed of a timing belt having an uneven surface.

7. The drive apparatus of claim 1 wherein at least one of either of the above-mentioned first or second belt-shaped member is composed of a V belt.

8. The drive apparatus of claim 2 wherein at least one of either of the above-mentioned first or second belt-shaped member is composed of a V belt.

9. The drive apparatus of claim 7 wherein the above-mentioned V belt is composed of a timing belt having an uneven surface.

10. The drive apparatus of claim 8 wherein the above-mentioned V belt is composed of a timing belt having an uneven surface.

11. The drive apparatus of claim 1 wherein at least one of either of the above-mentioned first or second belt-shaped member is composed of a chain.

12. The drive apparatus of claim 2 wherein at least one of either of the above-mentioned first or second belt-shaped member is composed of a chain.

* * * * *